United States Patent Office 3,488,420
Patented Jan. 6, 1970

3,488,420
CONTROLLED SOLUBILITY SANITIZER TABLET
Russell R. Keast, Yardley, Pa., and Ewald H. Krusius, South River, and John S. Thompson, Princeton Junction, N.J., assignors to FMC Corporation, New York, N.Y., a corporation of Delaware
No Drawing. Filed Mar. 13, 1967, Ser. No. 622,390
Int. Cl. A01n 11/00; C09k 3/00; A61k 13/00
U.S. Cl. 424—128
5 Claims

ABSTRACT OF THE DISCLOSURE

A non-effervescent sanitizing tablet is made up containing as essential ingredients a chlorinated isocyanuric acid (a chlorine-release agent) such as trichloroisocyanuric acid or dichloroisocyanuric acid, a granular or powdered alkali metal polyphosphate, and a metal stearate, said metal being either Na, Ca, Zn or Mg. The dissolution rate of the tablet in water is controlled by varying the type of alkali metal polyphosphate and the ratio of alkali metal polyphosphate to chlorinated isocyanuric acid utilized. The tablet is added to aqueous solutions requiring fixed levels of available chlorine, e.g., a swimming pool, and it liberates available chlorine at a predetermined, constant rate commensurate with its dissolution rate.

BACKGROUND OF THE INVENTION

Field of the invention

The invention covers a sanitizer tablet having controlled solubility for use in supplying predetermined quantities of active chlorine at a given rate when placed in an aqueous solvent.

Description of the prior art

Chlorine release agents that give off available chlorine when placed in water such as chlorine gas, sodium hypochlorite, calcium hypochlorite and chlorinated isocyanuric acids and their salts, have been used as bactericides to kill pathogenic bacteria and to prevent their growth in swimming pools, portable water supplies and the like. While these chlorine release agents are effective as bactericides when placed in water, they suffer the serious drawback of decomposing rapidly on exposure to sunlight and in contact with metals such as iron or copper; these metals normally are present in the equipment handling the above water solutions. The rate of decomposition is particularly high in the very dilute solutions used in swimming pools and potable water supplies. In swimming pools, for example, where it is desired to maintain an available chlorine content of about 0.4 to 1.5 parts per million (p.p.m.), it is generally necessary to replace this amount of available chlorine continuously when the swimming pool is exposed to sunlight during an ordinary sunny day. While the chlorine contents of these pools can be stabilized to a large extent by the inclusion of stabilizers such as cyanuric acid, ammelide, and their salts as described in detail in U.S. Patent 2,988,471 issued to Robert J. Fuchs and Irwin A. Lichtman on June 13, 1961, nevertheless available chlorine must be continuously added to the pool to replace that which is prematurely decomposed.

In an effort to maintain the available chlorine content of these aqueous systems at a constant level, various means have been employed. Among these are complicated and expensive mechanical feeders which will meter chlorine gas or solutions of liquid, inorganic hypochlorites into an aqueous pool at constant rates. The chlorine release agent can be added to the pool directly or more commonly it can be introduced into the stream of a recirculating system which constantly passes pool water through a filter at a given rate and purifies it. While these feeders are effective, they require constant attention and recalibration in order to insure that the proper amount of chlorine release agent is fed into the pool. Otherwise, excess concentrations of available chlorine are developed in the pool and are objectionable in that they irritate the eyes and mucous membranes of the swimmers. If the available chlorine content is too low, it will not achieve its purpose of killing the pathogenic bacteria which are present.

Other techniques for metering in hypochlorite at a constant rate include the use of porous bags containing inorganic calcium hypochlorite mixed with sodium sulfate. When the porous bag is placed in the pool it releases sodium hypochlorite and the bag retains the by-product calcium sulfate. This type of system has disadvantages in that sodium hypochlorite is released at one specific rate which cannot be varied, and that subsequent removal of the spent porous bags from the pool is required. Failure to do so can result in rupture of these porous bags with the release of the insoluble calcium sulfate in the pool.

As a result there is a need for some means which will permit the release of available chlorine at predetermined rates in the pool in a simple manner without constant maintenance and which is free of insoluble residues.

Summary of the invention

We have now found that a sanitizer tablet having controlled solubility and which is especially useful in maintaining the active chlorine content of an aqueous solution can be produced by preparing a powdered mixture containing from 60 to 97% by weight of a chlorinated isocyanuric acid which may be either trichloroisocyanuric acid or dichloroisocyanuric acid, from 2.5 to 37% by weight of a polyphosphate which may be either Phase II sodium tripolyphosphate, Phase I sodium tripolyphosphate or sodium hexametaphosphate, and from ½ to 3% by weight of a metal stearate wherein said metal may be Na, Ca, Zn or Mg, and compressing the resultant powdered mixture into predetermined, shaped, strong tablets.

Description of the invention and the preferred embodiments

In carrying out the present invention, a powdered formulation is made up as follows:

The principal ingredient, the chlorinated isocyanuric acid, is measured into the formulation in amounts sufficient to constitute from about 60 to about 97% by weight of the formulation. The term "chlorinated isocyanuric acid" as used herein, is intended to cover all chlorinated cyanuric or isocyanuric acids regardless of the tautomeric form in which they may exit. The preferred range of chlorinated isocyanuric acid is from about 80 to about 90% by weight and can be made up of either trichloroisocyanuric acid or dichloroisocyanuric acid. The next essential constituent of the formulation is a polyphosphate. The polyphosphate is added in amounts of from about 2.5 to about 37% by weight of the formulation with about 5 to 15% being preferred. The granular or powdered polyphosphate utilized may be either Phase II sodium tripolyphosphate, Phase I sodium tripolyphosphate, or sodium hexametaphosphate, depending upon the rate at which the desired sanitizer tablet is to dissolve. In general, the use of Phase II sodium tripolyphosphate results in the fastest dissolving tablet while Phase I sodium tripolyphosphate and sodium hexametaphosphate result in increasingly slower dissolving tablets. Further, the more polyphosphate which is utilized, relative to the chlorinated cyanuric acid, the faster will be the dissolving rate of the resulting sanitizer tablet.

The third essential ingredient to the formulation is a metal stearate, wherein the metal is either sodium, calcium, zinc or magnesium. The metal stearate is added in small but effective amounts up to about 3% by weight of the formulation; it acts as a tablet lubricant during pressing of the formulation into tablets. The added stearate results in tablets that are dense and strong, have a smooth, glossy exterior and are not readily abradable or breakable during manufacture, in transit or in storage.

The tablet can also contain other conventional additives such as coloring matter, various dyes, perfumes and the like. Generally, these tablets do not require fillers as do their comparable detergent tablets, since it is desired to obtain the greatest amount of active chlorine possible per unit tablet. Any desired additives are simply added to the formulation and the entire powdered mixture is then uniformly blended. The powdered formulation, which is homogeneously dispersed, is then tableted by placing given quantities of the formulation into a press and pressing them to size to form the resultant sanitizer tablets. The pressure used to press these tablets will vary depending upon the bulk density of the powdered formulation which is to be pressed. In general, the pressures normally utilized range from 10,000 to 20,000 p.s.i. in order to obtain an acceptable sanitizer tablet. The resulting sanitizer tablet has a specific gravity of from about 1.4 to 1.7 g./cc.; the preferred range is from 1.60 to 1.64 g./cc.

In the preferred manner of use, the sanitizer tablet is placed in the skimmer of a swimming pool; the skimmer is normally used as the water intake of a recirculating system for constant purification and circulation of the pool water. The resulting intake water constantly flows over the sanitizer tablet and both available chlorine and polyphosphate are released into the intake water stream. This mode of use has the advantage, other than more uniform distribution of available chlorine throughout the pool, of permitting the dissolved polyphosphate in the intake stream to contact any metal surfaces, pipes or heat exchangers used in the filtering and recirculating system before it is diluted by the entire volume of pool water. The dissolved polyphosphate in the recirculating system provides threshhold levels of polyphosphate that softens the pool water and helps minimize scale build-up on pipes and metal parts used in the recirculating and filtering system and particularly on heat exchangers commonly used in heated pools. However, once the recirculating stream containing dissolved polyphosphate passes into the pool, the polyphosphate is diluted to levels where its effectiveness is seriously reduced. Obviously, where a recirculating system is not used or the tablets cannot be conveniently used in this manner, they may be added directly to the pool and the available chlorine is slowly released directly into the pool.

The number of tablets added to a pool is that amount which will replace the active chlorine dissipated during normal use of the pool. The rate at which the active chlorine is liberated depends upon a number of factors. These include the relative proportion of the alkali metal phosphate to the chlorinated isocyanuric acid, the type of alkali metal phosphate which is present in the sanitizer tablet, the degree of compaction in forming the tablets, and the rate and temperature of the water flowing over the tablets. If desired, it is possible to use tablets containing Phase II sodium tripolyphosphate to obtain more rapid release of available chlorine to initially buildup the available chlorine content to the required level. Thereafter, more slowly dissolving sanitizer tablets containing Phase I sodium tripolyphosphate or sodium hexametaphosphate can be used to replace the available chlorine which is lost due to natural dissipation. Thus, depending upon the make-up of the tablet, they can be used to boost the available chlorine over a short period of time, while others can be used to maintain the available chlorine levels for prolonged periods by replacing the available chlorine at the same rate it is dissipated by sunlight and other such sources.

The present sanitizer tablets are easy to use and require no maintenance since they are merely added to the aqueous solution and dissolve at a controlled rate by surface erosion of the tablet. The tablets do not disintegrate; rather, they constantly erode and provide a prolonged source of available chlorine through an inherent "self-feeding" of the chlorinated isocyanuric acid without the need for mechanical metering aids. Further, the instant, slowly soluble tablets are acidic so that they reduce the amount of auxiliary acidic materials commonly added for pH control in swimming pools. Also, the tablets do not leave any residue; their contents are completely soluble in the aqueous solution at the concentration levels at which they are employed. As a result, the use of these tablets even in large quantities does not result in any unsightly, white powdery residue in the pool as is the case with calcium hypochlorite and other calcium salts. Since they leave no residue, they are truly maintenance free.

The following examples are given to illustrate the present invention but are not deemed to be limiting thereof.

EXAMPLE 1

Run A—Sanitizer tablets made by the present process

The following formulations were mixed in a kitchen-aid sanitary mixer (Model 4–C, Hobart Manufacturing Company, Troy, Ohio) for about 5 minutes.

FORMULATIONS

| Number | Chlorinated isocyanuric (wt. percent) | | Sodium polyphosphate (wt. percent) | | | Sodium stearate (wt. percent) |
|---|---|---|---|---|---|---|
| | TCCA [1] | DCCA [2] | STPP II [3] | STPP I [4] | SHMP [5] | |
| 1 | 90 | | 9.5 | | | 0.5 |
| 2 | 90 | | | 9.5 | | 0.5 |
| 3 | 90 | | | | 9.5 | 0.5 |
| 4 | 65 | | | | 32 | [6] 3 |
| 5 | | 68.5 | | 31 | | 0.5 |

[1] Trichloroisocyanuric acid.
[2] Dichloroisocyanuric acid.
[3] Sodium tripolyphosphate Form II.
[4] Sodium tripolyphosphate Form I.
[5] Sodium hexametaphosphate.
[6] Calcium stearate used in place of sodium stearate.

The resulting formulations, which were in finely powdered form and homogeneously blended were pressed in a Model D Stokes press to form tablets weighing 12 grams and having a diameter of 1 inch. Tableting pressure was on the order of 15,000 p.s.i. and the resulting tablets had a density of 1.62 g./cc. A portion of the tablets was tested for strength by being pressed on edge after formation. It was found that these tablets could withstand a 60 pound force applied to the edge without crushing. Since this is far beyond that normally required for packaging and handling strength, greater forces were not applied on the tablet. The resulting formulas were tableted without capping or sticking of the formulation to the die.

The tablets were then tested for dissolution time in a laboratory test and some were subjected to field tests. In the laboratory test the tablets were placed inside a one-half inch wire mesh cage which was suspended in 75° F. agitated tap water, and the time required for the tablets to become small enough to escape from the cage was measured. In the field test the tablets were placed in swimming pool skimmers and the in-flowing stream from a circulating pump was allowed to run over them; the time measured for the tablets to disappear was recorded. The ranges in dissolution time depend on the variation in the pool water temperature and water flow rate. The results of the testing are shown in Table 1.

TABLE 1.—TABLET DISSOLUTION TIME

| Number | Laboratory test (minutes) | Field test (hours) |
|---|---|---|
| 1 | 10 | |
| 2 | 75 | 25–50 |
| 3 | 360 | 150–250 |
| 4 | 150 | |
| 5 | 33 | |

Run B—Sanitizer tablets containing only chlorinated cyanuric acid without sodium stearate or a polyphosphate By way of comparison a series of tablets was formed containing chlorinated cyanuric acid but without the polyphosphate or the sodium stearate powder. The resulting tablets which were pressed in exactly the same way as Run A broke on ejection from the tableting machine and readily crumbled when slight force was applied to the tablet edge.

EXAMPLE 2

The formulations of Example 1, Run A were repeated except that in place of sodium stearate, zinc stearate and magnesium stearate were used separately in making up the sanitizer tablets. These tablets were found to have the same excellent strength as those produced in Run A in that they withstood a 60 pound force applied to the tablet's edge without crushing and had dissolving times substantially the same as those reported in Run A.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In a process for maintaining the available chlorine concentration of an aqueous body exposed to chlorine-dissipation by sunlight at a level effective to kill all pathogenic bacteria present and to prevent their growth in swimming pools or potable water supplies, said effective level being insufficient to develop excess concentrations of available chlorine that are objectionable in that they irritate the eyes and mucous membranes of swimmers which comprises maintaining the aqueous body in contact with a non-disintegrating, non-effervescent sanitizer tablet having a specific gravity of about 1.4 to about 1.7 g./cc. consisting essentially of, as essential ingredients, about 60 to about 97% by weight of a chlorinated isocyanuric acid selected from the group consisting of trichloroisocyanuric acid and dichloroisocyanuric acid, and about ½ to about 3% by weight of a metal stearate wherein said metal is selected from the group consisting of sodium, calcium, zinc and magnesium, said non-disintegrating sanitizing tablet dissolving by constant surface erosion of the tablet at a controlled, slow and prolonged rate sufficient to maintain the available chlorine concentration in said water within predetermined concentrations, the improvement which consists of the step of replacing an available chlorine content of 0.4 to 1.5 p.p.m. at the same rate it is dissipated from said aqueous body with each of said non-disintegrating sanitizing tablets having therein from about 2.5 to about 37% by weight of a polyphosphate selected from the group consisting of Phase II sodium tripolyphosphate, Phase I sodium tripolyphosphate and sodium hexametaphosphate, in preselected amounts, controlling the desired rate at which the sanitizer tablet is to dissolve varying from fastest dissolving tablets having Phase II sodium tripolyphosphate therein, to slower dissolving tablets having Phase I sodium tripolyphosphate and/or hexametaphosphate therein.

2. The process of claim 1 wherein the polyphosphate is Phase II sodium tripolyphosphate and the isocyanuric acid is trichloroisocyanuric acid.

3. The process of claim 1 wherein the polyphosphate is Phase I sodium tripolyphosphate and the isocyanuric acid is trichloroisocyanuric acid.

4. The process of claim 1 wherein the polyphosphate is sodium hexametaphosphate and the isocyanuric acid is trichloroisocyanuric acid.

5. The process of claim 1 which is prepared by homogeneously mixing said essential ingredients into a uniform, powdered mixture, said mixture is pressed under a pressure of from 10,000 to 20,000 p.s.i., and a tablet having a density of from about 1.4 to about 1.7 g./cc. is recovered.

References Cited

UNITED STATES PATENTS

| 2,607,738 | 8/1952 | Hardy | 252—99 |
| 2,980,622 | 4/1961 | Symes | 252—99 |
| 3,338,836 | 8/1967 | Krusius et al. | 252—99 |
| 3,342,674 | 9/1967 | Kowalski | 424—249 XR |
| 3,360,469 | 12/1967 | Fuchs | 252—99 |
| 3,367,876 | 2/1968 | Keast et al. | 252—99 |
| 3,390,092 | 6/1968 | Keast et al. | 252—99 |

OTHER REFERENCES

Thompson, J. S.: "Formulating With Dichloroisocyanurates," Soap and Chemical Specialties, pp. 45–48, 122–123, June 1964.

S. K. ROSE, Primary Examiner

U.S. Cl. X.R.

21—58; 71—67; 162—190; 210—62; 252—99, 186; 424—249